(12) United States Patent
Mitchell

(10) Patent No.: US 10,040,046 B2
(45) Date of Patent: *Aug. 7, 2018

(54) SYSTEMS AND METHODS OF TREATING WATER USED FOR HYDRAULIC FRACTURING

(71) Applicant: BOSQUE SYSTEMS, LLC, Fort Worth, TX (US)

(72) Inventor: Robert Mitchell, Weatherford, TX (US)

(73) Assignee: BOSQUE SYSTEMS, LLC, Fort Worth, TX (US)

(*) Notice: Subject to any disclaimer, the term of this patent is extended or adjusted under 35 U.S.C. 154(b) by 93 days.

This patent is subject to a terminal disclaimer.

(21) Appl. No.: 15/150,228

(22) Filed: May 9, 2016

(65) Prior Publication Data

US 2016/0251566 A1 Sep. 1, 2016

Related U.S. Application Data

(63) Continuation of application No. 14/106,052, filed on Dec. 13, 2013, now Pat. No. 9,358,517, which is a continuation of application No. 14/020,495, filed on Sep. 6, 2013, now Pat. No. 8,962,534.

(60) Provisional application No. 61/697,932, filed on Sep. 7, 2012.

(51) Int. Cl.
*B01J 19/00* (2006.01)
*C02F 1/76* (2006.01)
*C02F 1/68* (2006.01)
*C09K 8/62* (2006.01)
*C02F 103/10* (2006.01)

(52) U.S. Cl.
CPC ........... *B01J 19/0006* (2013.01); *C02F 1/685* (2013.01); *C02F 1/76* (2013.01); *C02F 1/763* (2013.01); *C09K 8/62* (2013.01); *B01J 2219/00056* (2013.01); *B01J 2219/00069* (2013.01); *C02F 2103/10* (2013.01); *C02F 2303/04* (2013.01)

(58) Field of Classification Search
CPC ........... B01J 19/0006; B01J 2219/0069; C02F 1/763; C02F 1/76; C02F 1/685
USPC ......................... 422/108, 110, 111; 210/754
See application file for complete search history.

(56) References Cited

U.S. PATENT DOCUMENTS

| | | | |
|---|---|---|---|
| 4,731,193 A | 3/1988 | Mason et al. |
| 4,945,992 A | 8/1990 | Sacco |
| 6,325,970 B1 | 12/2001 | Parkinson et al. |
| 6,949,196 B2 | 9/2005 | Schmitz et al. |
| 7,452,511 B2 | 11/2008 | Schmitz et al. |
| 2007/0102359 A1 | 5/2007 | Lombardi et al. |
| 2010/0006513 A1 | 1/2010 | Fishler et al. |
| 2010/0059226 A1 | 3/2010 | Termine et al. |
| 2011/0132815 A1 | 6/2011 | Angelilli et al. |
| 2011/0137465 A1 | 6/2011 | Angelilli et al. |

*Primary Examiner* — Lessanework Seifu
(74) *Attorney, Agent, or Firm* — Nixon & Vanderhye P.C.

(57) ABSTRACT

A system and method of treating a fluid to be used for hydraulic fracturing adds an effective amount of chlorine dioxide to the fluid to act as a biocide that kills harmful bacteria. A system for adding chlorine dioxide to the fluid can continuously add chlorine dioxide to an incoming flow of the fluid to produce a continuous flow of treated fluid.

9 Claims, 3 Drawing Sheets

SYSTEMS AND METHODS OF TREATING WATER USED FOR HYDRAULIC FRACTURING

This application is a continuation of U.S. application Ser. No. 14/106,052, filed Dec. 13, 2013, which is a continuation of U.S. application Ser. No. 14/020,495, filed Sep. 6, 2013, now issued as U.S. Pat. No. 8,962,534, which itself claims priority to U.S. Provisional Application No. 61/697,932, filed Sep. 7, 2012, the entire contents of which are hereby incorporated by reference.

BACKGROUND

Hydraulic fracturing refers to a process in which a wellbore is drilled into a rock formation, and a fracturing fluid is then pumped into the wellbore under great pressure to induce an initial set of fractures in the rock formation. The fracturing fluid is then forced into the initial fractures, extending the fractures further. An operator may then introduce a proppant into the fracturing fluid that is being pumped into the fractures, such as sand, ceramic particles to other particulates. The proppant is designed to prevent the fractures from closing when the fracturing fluid pressure is reduced or when pumping stops.

Once the fracturing process is complete, petroleum, natural gas and other fluids which are under considerable pressure in the rock formation escape through the fractures and into the wellbore. The petroleum and natural gas is ultimately extracted through the fractures and the wellbore and is captured and stored. During the initial stages after the fracturing is completed, the petroleum and natural gas may push much of the fracturing fluid back up the well bore. However, it is also common for a significant percentage of the fracturing fluid to disperse into the surrounding rock through the fractures that were created.

The fracturing fluid which is pumped into the wellbore typically includes water. However, various chemicals and materials are added to the water for various purposes. The chemicals that are added can depend upon the type of well and the underground rock formations that are being fractured. In addition to the proppants mentioned above, friction reducing additives can be used to increase the flow rate and to reduce the pressure needed to pump the fracturing fluid into the well. Oxygen scavengers and other stabilizers and corrosion inhibitors can be added to prevent corrosion of the pipes. Acid, such as hydrochloric acid, can be added to help dissolve minerals and induce fractures. Surfactants and crosslinking agents help to maintain fluid viscosity, particularly as temperature increases. Gels can be added to help suspend greater amounts of proppants in the fracturing fluid. A scale inhibitor may be added to prevent scale deposits in the pipes. A pH adjusting agent may be added to maintain the effectiveness of the other agents, particularly the crosslinkers. Finally, various biocides may be added to eliminate bacteria which can produce corrosive byproducts that attack the pipes. The biocides that are added to fracturing fluid can include glutaraldehyde, quaternary amines, active liquid brominated propionamide solutions and other materials. It is important that any biocide added to the fracturing fluid not disrupt or inhibit the functions performed by the other additives.

Because the fracturing fluid can escape into the surrounding rock formations, and ultimately propagate into the water table, there is great concern about the chemical additives that are present in the fracturing fluid. Thus, operators are seeking to use chemicals which are known to be safe to humans, animals and the environment.

DETAILED DESCRIPTION OF PREFERRED EMBODIMENTS

The inventor has discovered that chlorine dioxide can be used as an effective biocide in fracturing fluids. Chlorine dioxide in appropriate concentrations can be as effective, or more effective, in eliminating harmful bacteria in fracturing fluid than known biocides used for this purpose, such as glutaraldehyde, quaternary amines, and active liquid brominated propionamide solutions. In addition, chlorine dioxide is an EPA approved material for use as a biocide because it is not harmful to humans, animals or the environment when used in the low dosages and concentrations required for effective use as a biocide.

Chlorine dioxide can be formed in many different ways. Some of the reactions which produce chlorine dioxide result in the formation of free chlorine, which is undesirable. However, the inventor has determined that an effective reaction that produces chlorine dioxide that can be used as a biocide in fracturing fluid, and which does not result in the production of free chlorine is the reaction formula:

$$5NaClO_2 + 4HCl \rightarrow 5NaCl + 4ClO_2 + 2H_2O.$$

Figure 1:
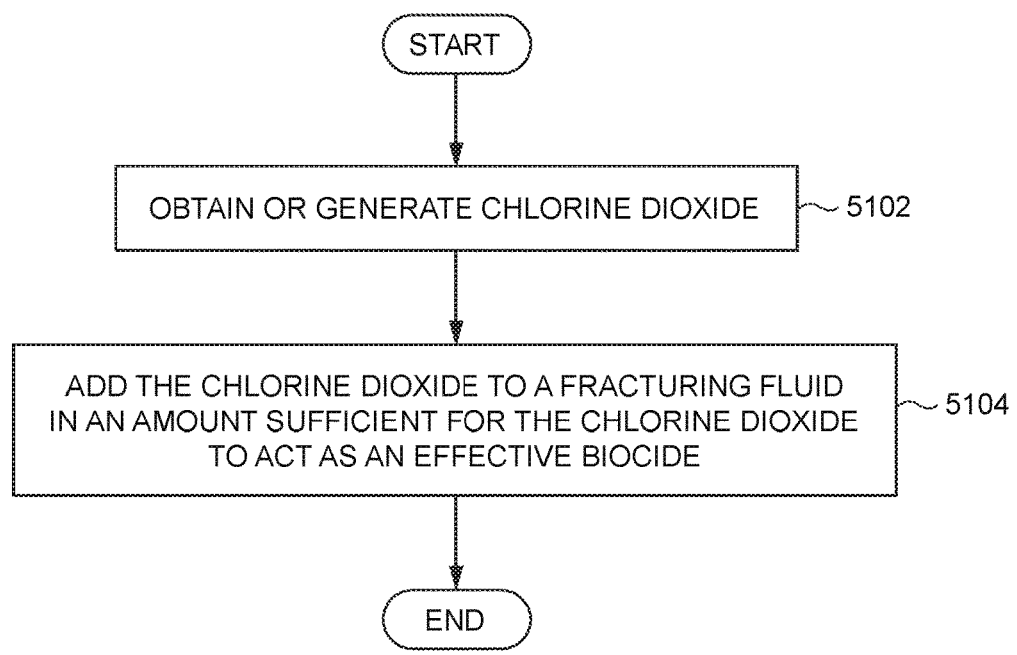
FIG. 1 is flow diagram illustrating a method of treating a fracturing fluid with a biocide.

A flowchart illustrating a method embodying the invention for treating a fluid that is to be used for hydraulic fracturing is presented in FIG. 1. As shown in FIG. 1, the method begins in step S102, where a supply of chlorine dioxide is either obtained or generated. If the chlorine dioxide is to be generated, it is preferably generated according to the reaction formula illustrated above. In alternate embodiments, a supply of chlorine dioxide could be generated in other ways. In still other alternate embodiments, a supply of chlorine dioxide could simply be obtained from a source.

In step S104, the obtained or generated chlorine dioxide is added to a flow of fluid which is to be used for hydraulic fracturing. The chlorine dioxide is added in an amount that results in the concentration of the chlorine dioxide in the fracturing fluid being high enough to act as an effective biocide to kill harmful bacteria that may be present in the fracturing fluid. However, the concentration should also be low enough that the residual chlorine dioxide present in the fracturing fluid will not be harmful to humans, animals or the environment. The concentration must also remain low enough to prevent the chlorine dioxide from interfering with the functions performed by the other additives and chemicals that are present in the fracturing fluid. Desirable residual concentrations are generally within the range of 0.1 to 0.8 parts per million.

The inventor has developed a treatment system which continuously mixes chlorine dioxide into an incoming flow of fluid which is to be used for hydraulic fracturing. Thus, the treatment system developed by the inventor can perform a method as illustrated in FIG. 1. Once the treatment system has added chlorine dioxide to the incoming flow, the flow can be immediately used for hydraulic fracturing, or the treated fluid can be collected in a storage tank before the treated fluid is actually pumped into a wellbore during a hydraulic fracturing process.

Figure 2:
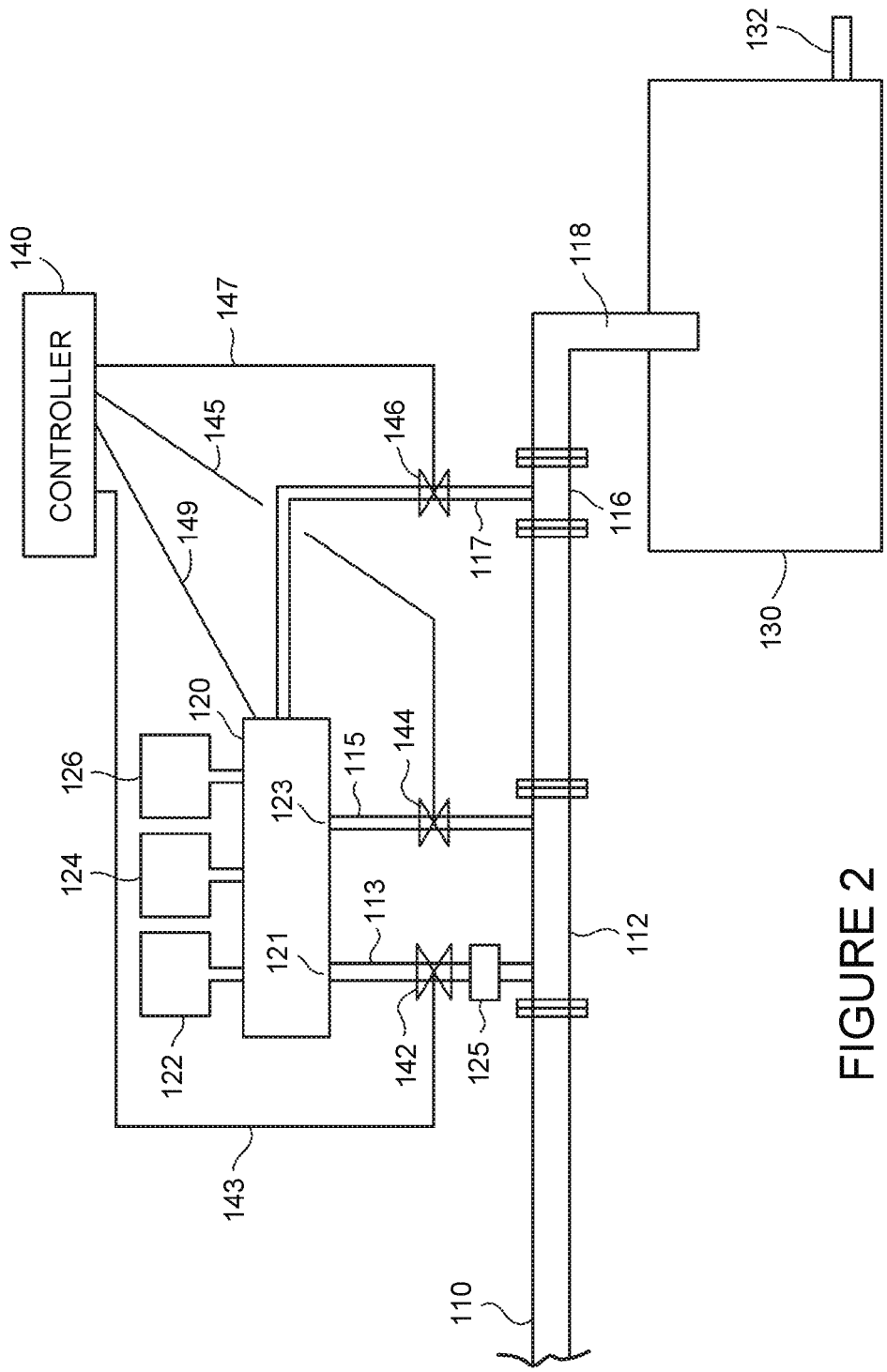
FIG. 2 is a diagram of a system for treating a fracturing fluid with a biocide.

A first embodiment of such a treatment system is illustrated in FIG. 2. As shown therein, a fluid supply pipe 110 receives a flow of fluid that is to be used for hydraulic fracturing. The fluid flows along the supply pipe 110 to an outlet end 118 which delivers the fluid to a fracturing fluid storage tank 130. As the fluid flows along the supply pipe 110, chlorine dioxide is added to the fluid by a chlorine dioxide treating unit 120.

As shown in FIG. 2, a header 112 installed in the fluid pipe 110 includes an inlet pipe 113 that is attached to an inlet 121 of the chlorine dioxide treating unit 120. An outlet pipe 115 which is attached to an outlet 123 of the chlorine dioxide treating unit delivers treated fluid back into the supply pipe 110 via the header 112.

In operation, a relatively small percentage of the fluid flowing through the supply pipe 110 is routed through the header 112, the inlet pipe 113 and the inlet 121 into the chlorine dioxide treating unit 120. Chlorine dioxide is added to the received fluid, and the treated fluid is send back into the supply pipe 110 via the outlet 123, outlet pipe 115 and the header 112. The treated fluid mixes with the fluid in the supply pipe 110 as it travels along the supply pipe 110 to the outlet 118 and into the fracturing fluid storage tank 130.

The fluid in the supply pipe 110 is typically under pressure. The flow of fluid through the inlet pipe 113, the chlorine dioxide treating unit 120 and the outlet pipe 115 will generate flow losses which result in the fluid in the outlet pipe being at a lower pressure than the fluid in the supply pipe 110. In order to force the treated fluid from the outlet pipe 115 back into the fluid supply pipe 110, it is necessary to raise the pressure of the fluid in the outlet pipe 115. A booster pump 125 located on the inlet pipe 113 can be used for this purpose. However, the booster pump 125 could be located at alternate positions, such as within the chlorine dioxide treating unit 120, or on the outlet pipe 115.

In some embodiments, the chlorine dioxide treating unit 120 may receive a supply of chlorine dioxide that is added to the fluid. In alternate embodiments, the chlorine dioxide treating unit 120 may include a first supply reservoir 122, a second supply reservoir 124, and a third supply reservoir 126. The first supply reservoir 122 contains a supply of sodium chlorite, and the second supply reservoir 124 contains a supply of hydrochloric acid. The third supply reservoir 126 contains a supply of fresh water. The chlorine dioxide treating unit 120 utilizes the sodium chlorite, hydrochloric acid and fresh water to generate chlorine dioxide which is then added to the fluid.

In some embodiments, the chlorine dioxide treating unit 120 may include a flow meter. Alternatively, a flow meter could be installed on the header 112, the inlet pipe 113, or the outlet pipe 115. In such an embodiment, the flow meter would indicate the flow rate of the fluid passing through the chlorine dioxide treating unit 120, and this information could be used to determine the appropriate amount of chlorine dioxide to add to the fluid.

In alternate embodiments, a test header 116 having a sample pipe 117 is connected to the fluid supply pipe 110 downstream from the header 112. The sample pipe 117 conveys a sample of the treated fluid back to the chlorine dioxide treating unit 120, which checks the concentration of chlorine dioxide in the fluid collected through the sample pipe 117. The chlorine dioxide treating unit can then selectively vary the amount of chlorine dioxide being added to the fluid to achieve the proper concentration of chlorine dioxide in the fluid. By sampling the fluid from a location well downstream of where the treated fluid is delivered back into the supply pipe 110, it is possible to ensure that the treated fluid delivered into the supply pipe 110 via the outlet pipe 115 has fully mixed with the fluid in the supply pipe 110 such that a final resulting chlorine dioxide concentration has been achieved.

As also illustrated in FIG. 2, in some embodiments control valves 142 and 144 are installed on the inlet pipe 113 and outlet pipe 115, respectively. A controller 140 is coupled to the control valves 142, 144 and to the chlorine dioxide treating unit 120. In this embodiment, the controller 140 selectively varies the flow rate of the fluid through the chlorine dioxide treating unit 120 to control the amount of chlorine dioxide that is added to the fracturing fluid in the supply pipe 110. The controller 140 may also, or alternatively, exert control over the amount of chlorine dioxide that the chlorine dioxide treating unit 120 is adding to the fluid. Thus, the controller 140 could be used ensure that the appropriate amount of chlorine dioxide is being added to the fluid.

In some instances, a control valve 146 may also be installed in the sample line 117 that is connected to the test header 116. In those embodiments, the controller 140 may also be coupled to the control valve 146 to control the flow of fluid through the sample line 117.

The fluid being delivered into the supply pipe 110 can be acquired from many different sources in different fracturing operations. Often the fluid is acquired from a local lake or pond, from a well, or the fluid is delivered via a tanker truck. In some instances, it may be possible to acquire water from a local water supply system operated by a municipality or a city. Because the fluid can be acquired from many different sources, there can be different amounts of bacteria or other biological contaminants which are to be partially or fully eliminated by the chlorine dioxide treatment.

The chlorine dioxide that is added to the fluid is basically consumed in chemical reactions in order to eliminate the bacteria or other biological contaminants that are present in the fluid. Thus, some or all of the chlorine dioxide added to the fluid in the supply pipe 110 via the chlorine dioxide treating unit 120 will be consumed before the fluid is ultimately used in a fracturing operation.

It is desirable for the residual amount of chlorine dioxide that is present in the fluid ultimately used in a fracturing operation to be in the range of 0.1 to 0.8 ppm. However, one cannot simply add an amount of chlorine dioxide to the fluid in the supply pipe 110 in a predetermined volume amount to achieve this concentration because some of the chlorine dioxide that is added to the fluid will be consumed in eliminating bacteria and other biological contaminants that were present in the fluid being supplied into the fluid supply pipe 110. And because one can never be certain how much bacteria or other biological contaminants are present in the supply water, one can never know in advance how much chlorine dioxide will be consumed.

Because of these factors, it is desirable to test the fluid in the fluid fracturing storage tank 130, or perhaps even farther downstream in the supply chain to determine the actual residual chlorine dioxide concentration in the fracturing fluid once some of the chlorine dioxide has been consumed in eliminating bacteria and other biological contaminants. If the residual chlorine dioxide concentration is too low, the chlorine dioxide treating unit 120 can be adjusted to insert greater amounts of chlorine dioxide into the fluid, or vice versa. Periodic testing may be required to continually adjust the amount of chlorine dioxide that is being added to the fluid in the fluid supply pipe 110 to ensure that the residual chlorine dioxide concentration in the fluid being used in fracturing operations is within the desirable range.

In some embodiments, the sample pipe 117 may be located sufficiently far downstream that the bacteria and other biological contaminants originally present in the supply water will have been largely eliminated by the chlorine dioxide before a sample of the fluid is drawn through the sample pipe 117. Thus, measuring the concentration of the chlorine dioxide in the fluid drawn from the sample pipe 117 may provide the information needed to continually adjust the amount of chlorine dioxide being added by the chlorine dioxide treating unit 120 to achieve a desirable residual chlorine dioxide concentration. This may make it possible for the controller 140 to provide automated control of the amount of chlorine dioxide that is added.

In other embodiments, manual samples of the fluid may be drawn from other locations that are farther downstream, such as from a location just before the fluid is used in a fracturing operation. In that instance, it may be necessary for an operator to manually adjust the amount of chlorine dioxide that is being added by the chlorine dioxide treating unit 120.

Figure 3:
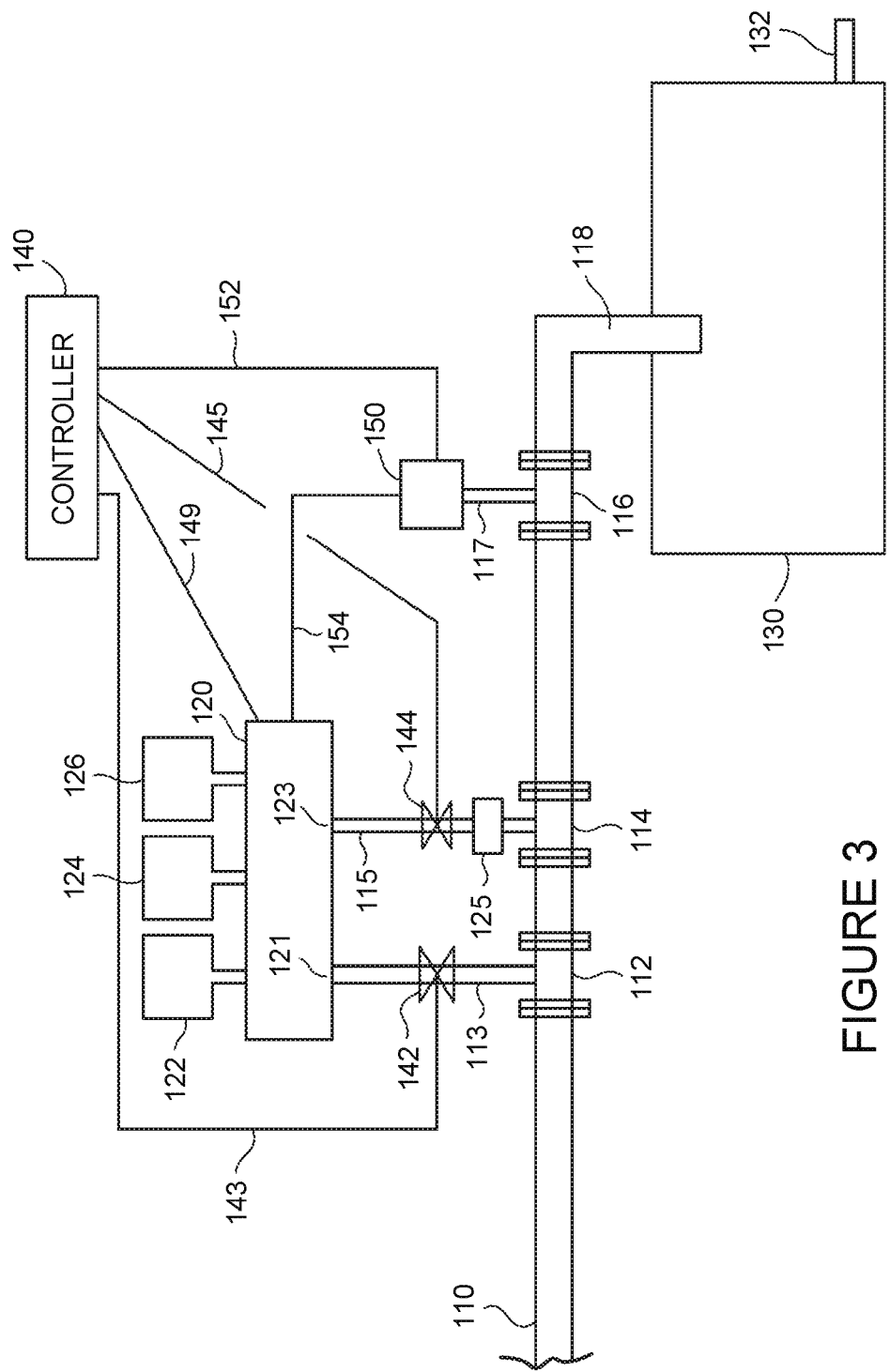
FIG. 3 is a diagram of an alternate system for treating a fracturing fluid with a biocide.

FIG. 3 illustrates an alternate embodiment of the system which is similar to the one discussed above in connection with FIG. 2. Accordingly, only the differences will be discussed.

In the embodiment illustrated in FIG. 3, the booster pump 125 is located on the outlet line 115 connected to the chlorine dioxide treating unit 120, instead of the inlet line 113. Also, instead of a single header 112, first and second headers 112, 114 are used to draw fluid from the supply pipe 110, and return treated fluid to the supply pipe 110, respectively. Also, the sample pipe 117 connected to the test header 116 is coupled to an analyzer unit 150. The analyzer unit 150 determines a concentration of chlorine dioxide in the fluid obtained through the sample pipe 117. The analyzer unit 150 then sends a signal to the chlorine dioxide treating unit 120 via a control line 154, the signal being representative of the determined chlorine dioxide concentration. The chlorine dioxide treating unit 120 uses the signal to selectively adjust the amount of chlorine dioxide being added to the fluid to achieve a desired residual chlorine dioxide concentration in the fracturing fluid.

In an alternate embodiment, the analyzer unit 150 may be coupled to a controller 140 via a signal line 152, so that a signal representative of the determined chlorine dioxide concentration is received by the controller 140. The controller 140 may then instruct the chlorine dioxide treating unit 120 to selectively adjust the amount of chlorine dioxide being added to the fluid. Alternatively, or in addition, the controller 140 could utilize the signal from the analyzer unit 150 to selectively vary a flow rate through the chlorine dioxide treating unit 120, via one or both of the control valves 142, 144 to adjust the amount of chlorine dioxide being added to the fluid.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A system for treating a fluid used for hydraulic fracturing, comprising:
    a chlorine dioxide treating unit having an inlet and an outlet, wherein the chlorine dioxide treating unit is configured to add chlorine dioxide to a continuous flow of inlet fluid received through the inlet to create a treated fluid, and to output a continuous flow of the treated fluid though the outlet;
    a fluid supply pipe which includes an inlet that receives a supply of fluid that is to be used for hydraulic fracturing;
    at least one header that is coupled to the fluid supply pipe, the at least one header including an inlet pipe that is coupled to the inlet of the chlorine dioxide treating unit and an outlet pipe that is coupled to the outlet of the chlorine dioxide treating unit;
    an analyzer unit that determines a residual concentration of chlorine dioxide present in the fluid in the fluid supply pipe at a location sufficiently downstream from the at least one header that chlorine dioxide added to the fluid in the fluid supply pipe via the outlet pipe has had an opportunity to react with bacteria and/or biological contaminants in the fluid;
    a control valve that is mounted to at least one of the inlet pipe coupled between the at least one header and the inlet of the chlorine dioxide treating unit and the outlet pipe which is coupled between the outlet of the chlorine dioxide treating unit and the at least one header; and
    a controller that is coupled to the control valve and the analyzer unit, wherein the controller sends a control signal to the control valve to selectively vary a flow rate of fluid through the control valve based on the signal generated by the analyzer unit such that the continuous flow of treated fluid output by the chlorine dioxide treating unit and mixing with the fluid in the fluid supply pipe results in a desired residual concentration of chlorine dioxide being present in the fluid tested by the analyzer unit.

2. The system of claim 1, further comprising a test header that is coupled to the fluid supply pipe downstream from the at least one header, the test header including a sample supply pipe that is coupled to analyzer unit.

3. The system of claim 2, wherein the analyzer unit is part of the chlorine dioxide treating unit, wherein the analyzer unit receives a sample fluid from the fluid supply pipe via the test header and the sample supply pipe, and wherein the analyzer unit determines a concentration of chlorine dioxide in the sample fluid.

4. The system of claim 1, wherein the analyzer unit generates a signal that is indicative of the determined chlorine dioxide concentration.

5. The system of claim 4, wherein the chlorine dioxide treating unit receives the signal generated by the analyzer unit, and wherein the chlorine dioxide treating unit selectively varies an amount of chlorine dioxide that is added to the continuous flow of inlet fluid received through the inlet based on the signal received from the analyzer unit.

6. The system of claim 4, wherein the controller is also coupled to the chlorine dioxide treating unit, wherein the controller sends a control signal to the chlorine dioxide treating unit based on the signal generated by and received from the analyzer unit, and wherein the chlorine dioxide treating unit selectively varies an amount of chlorine dioxide that is added to the continuous flow of inlet fluid received through the inlet based on the signal received from the controller.

7. The system of claim 1, wherein the chlorine dioxide treating unit adds a predetermined amount of chlorine dioxide per unit volume of inlet fluid received via the inlet pipe, and wherein the controller controls the control valve to selectively vary a flow rate of fluid through the chlorine dioxide treating unit such that a residual concentration of chlorine dioxide present in the fluid tested by the analyzer unit is in the range of 0.1 to 0.8 parts per million.

8. The system of claim 1, wherein the chlorine dioxide treating unit adds a predetermined amount of chlorine dioxide per unit volume of inlet fluid received via the inlet pipe, and wherein the controller controls the control valve to selectively vary a flow rate of fluid through the chlorine dioxide treating unit such that a residual concentration of chlorine dioxide present in the fluid tested by the analyzer unit is in the range of 0.1 to 25 parts per million.

9. The system of claim 1, wherein the chlorine dioxide treating unit comprises:
   a first supply reservoir that is configured to hold sodium chlorite; and
   a second supply reservoir that is configured to hold hydrochloric acid, wherein the chlorine dioxide treating unit utilizes sodium chlorite from the first reservoir and hydrochloric acid from the second reservoir to generate chlorine dioxide according to the following chemical equation:

$$5NaClO_2 + 4HCl \rightarrow 5NaCl + 4ClO_2 + 2H_2O.$$

* * * * *